(12) United States Patent
Devine

(10) Patent No.: US 6,378,882 B1
(45) Date of Patent: Apr. 30, 2002

(54) HUMAN-POWERED EXERCISE CYCLE

(76) Inventor: John Devine, 5935 Hunters Ford Rd., Pacific, MO (US) 63069

( * ) Notice: Subject to any disclaimer, the term of this patent is extended or adjusted under 35 U.S.C. 154(b) by 0 days.

(21) Appl. No.: 09/775,154

(22) Filed: Feb. 1, 2001

(51) Int. Cl.[7] .......................... B62M 1/00; B62K 21/00
(52) U.S. Cl. ...................... 280/234; 280/240; 280/267; 280/287
(58) Field of Search .................... 280/230, 233, 280/234, 240, 242.1, 287, 263, 267–269, 278; 180/224

(56) References Cited

U.S. PATENT DOCUMENTS

| | | | | |
|---|---|---|---|---|
| 813,741 A | * | 2/1906 | Rudbeck | 280/233 |
| 3,760,905 A | | 9/1973 | Dower | |
| 4,020,914 A | * | 5/1977 | Trautwein | 280/267 |
| 4,072,325 A | * | 2/1978 | Bright et al. | 280/267 |
| 4,460,191 A | | 7/1984 | Ishibashi et al. | |
| 4,508,358 A | * | 4/1985 | Erel | 280/233 |
| 4,546,997 A | * | 10/1985 | Smyers | 280/267 |
| 4,639,007 A | * | 1/1987 | Lawrence | 280/233 |
| 4,786,070 A | | 11/1988 | Adee | |
| 4,799,704 A | * | 1/1989 | Colarusso | 280/267 |
| 4,928,986 A | | 5/1990 | Carpenter | |
| 5,145,196 A | * | 9/1992 | Langkamp | 280/287 |
| 5,690,346 A | | 11/1997 | Keskitalo | |
| 5,762,351 A | * | 6/1998 | Soohoo | 280/267 |
| 5,775,708 A | | 7/1998 | Heath | |
| 5,951,034 A | * | 9/1999 | Mayo | 280/287 |
| 6,007,083 A | | 12/1999 | Currie | |
| 6,155,584 A | | 12/2000 | Dallet | |
| 6,023,043 A1 | * | 3/2001 | Lehman | 280/267 |

FOREIGN PATENT DOCUMENTS

| RU | 800-011 | 10/1978 |
|---|---|---|
| RU | 120-953 A | 8/1984 |

* cited by examiner

Primary Examiner—Brian L. Johnson
Assistant Examiner—Matthew Luby
(74) Attorney, Agent, or Firm—Thompson Coburn LLP

(57) ABSTRACT

An exercise cycle comprising a frame, a hinge, and a drive mechanism. The frame comprises a forward frame member and a rearward frame member. The hinge operatively connects the forward frame member to the rearward frame member such that the forward and rearward frame members are pivotally moveable relative to each other about a hinge axis between operable and stowable positions. The drive mechanism includes an endless loop assembly. The exercise cycle is configured such that the frame may be folded without removal of the endless loop assembly. The cycle further includes left and right linearly reciprocating assemblies. The left reciprocating assembly is configured for being moved back and forth with foot pressure and hand pressure from a user's left hand and left foot. The right reciprocating assembly is configured for being moved back and forth with foot pressure and hand pressure from a user's right hand and right foot.

31 Claims, 11 Drawing Sheets

HUMAN-POWERED EXERCISE CYCLE

BACKGROUND OF THE INVENTION

This invention relates to human-powered exercise cycles, such as stationary exercise cycles and human-powered cycle vehicles.

Conventional human-powered exercise cycles are typically operated by pedal action where a user's legs are used to power a drive mechanism. Many are additionally operated by handle action where a user's arms are also used to power the drive mechanism. The drive mechanisms typically include a belt-drive or a chain-drive system.

Many of these conventional human-powered exercise cycles, especially recumbent-type cycles, are bulky and therefore difficult to transport. To address the transportation difficulty, some exercise cycles have been provided with foldable frames. One such foldable frame requires removal of a drive chain from sprockets of the cycle when the frame is in its folded position. This increases the time and effort needed to transform the cycle from its operating position to its folded position and vice versa. Another prior art foldable frame maintains the distance between a crank assembly and a driven sprocket regardless of whether the frame is in its operating or folded position and therefore does not require removal of the chain. However, such a foldable frame requires use of a compact drive system.

Many conventional human-powered exercise cycles employ both arm-powered and leg-powered drive mechanisms. With these cycles movement of the legs and arms are all linked together so that all must move together in a single manner, or the legs are linked together, or the arms are linked together, or none are linked together. The prior art cycles which are powered by both upper and lower body motion have not balanced comfort, ease of use, and efficiency of exercise.

SUMMARY OF THE INVENTION

Among the several advantages of the present invention may be noted the provision of an improved human-powered exercise cycle; the provision of such an exercise cycle which overcomes the disadvantages of the prior art exercise cycles; the provision of such an exercise cycle having a frame which may be folded to a stowable position; the provision of such an exercise cycle which may be folded to a stowable position without the need to remove any part of the drive mechanism; the provision of an exercise cycle adapted to be powered by both upper and lower body motion in a manner which is comfortable, easy to use and provides an efficient exercise.

In general, an exercise cycle of the present invention comprises a frame, a hinge, and a drive mechanism. The frame comprises a forward frame member and a rearward frame member. The hinge operatively connects the forward frame member to the rearward frame member such that the forward and rearward frame members are pivotally moveable relative to each other about a hinge axis between operable and stowable positions. The drive mechanism comprises a forward transmission wheel, a rearward transmission wheel, and an endless loop assembly. One of the forward and rearward transmission wheels constitute a driven transmission wheel. The forward transmission wheel is operatively connected to the forward frame member for rotational movement about a forward axis. The rearward transmission wheel is operatively connected to the rearward frame member for rotational movement about a rearward axis. The endless loop assembly is trained around the forward and rearward transmission wheels such that movement of one of the forward transmission wheel, rearward transmission wheel, and endless loop assembly causes movement of the other two of the forward transmission wheel, rearward transmission wheel, and endless loop assembly. The forward transmission wheel is a distance $D_o$ from the rearward transmission wheel when the frame members are in their operable position. The forward transmission wheel is a distance $D_s$ from the rearward transmission wheel when the frame members are in their stowed position. The distance $D_s$ is less than the distance $D_o$. The endless loop assembly and frame members are configured and adapted such that the endless loop assembly remains trained around the forward and rearward transmission wheels as the frame members are moved between the operable and stowable positions.

Another aspect of the present invention is an exercise cycle comprising a frame, left and right linearly reciprocating assemblies, a rotatable element, and a drive mechanism. The left linearly reciprocating assembly is operatively mounted on the frame for linear reciprocating motion relative to the frame along an axis $X_l$. The left reciprocating assembly comprises a left carriage movable along the axis $X_l$, a left foot pedal engageable by a user's left foot, and a left handle engageable by a user's left hand. The left foot pedal and the left handle are operatively connected to the left carriage such that the left foot pedal and the left handle move together with the carriage when the left carriage is moved along the axis $X_l$. The left handle is spaced from the left foot pedal in a manner to enable the user to push or pull the left handle with the user's left hand to move the left reciprocating assembly along the axis $X_l$ at the same time the user pushes or pulls the left foot pedal with the user's left foot to move the left reciprocating assembly along the axis $X_l$. The right linear reciprocating assembly is operatively mounted on the frame for linear reciprocating motion relative to the frame along an axis $X_r$. The right reciprocating assembly comprises a right carriage movable along the axis $X_r$, a right foot pedal engageable by a user's right foot, and a right handle engageable by a user's right hand. The right foot pedal and the right handle are operatively connected to the right carriage such that the right foot pedal and the right handle move together with the carriage when the right carriage is moved along the axis $X_r$. The right handle is spaced from the right foot pedal in a manner to enable the user to push or pull the right handle with the user's right hand to move the right reciprocating assembly along the axis $X_r$ at the same time the user pushes or pulls the right foot pedal with the user's right foot to move the right reciprocating assembly along the axis $X_r$. The rotatable element is operatively mounted on the frame for rotation relative to the frame about a rotatable element axis. The drive mechanism is operatively connected to the left and right linear reciprocating members and operatively connected to the rotatable element. The drive mechanism is adapted and configured for converting linear reciprocating motion of the left and right linear reciprocating members to rotational motion of the rotatable element about the rotatable element axis.

Another aspect of the present invention is an exercise cycle comprising a frame, left and right forward riding wheels, a rear riding wheel, and a spring mechanism. The left forward riding wheel is operatively connected to the frame for rotation relative to the frame about a left forward riding wheel axis. The right forward riding wheel is operatively connected to the frame for rotation relative to the frame about a right forward riding wheel axis. The rear riding wheel is operatively connected to the frame for rotation relative to the frame about a rear riding wheel axis.

The riding wheels are engageable with a riding surface, such as a road, for enabling the vehicle to roll along the riding surface. The left and right forward riding wheels are further operatively connected to the frame in a manner to enable the left and right forward riding wheels to be moveable between upright positions and slanted positions. The left and right forward riding wheel axes are generally parallel to the riding surface and the forward riding wheels are in contact with the riding surface when the forward riding wheels are in their upright positions. The left and right forward riding wheel axes are generally slanted relative to riding surface and the forward riding wheels are in contact with the riding surface when the forward riding wheels are in their slanted positions. The spring mechanism is configured and adapted for biasing the forward riding wheels in their upright positions.

Other advantages and features of the present invention will be in part apparent and in part pointed out hereinafter.

BRIEF DESCRIPTION OF THE DRAWINGS

Corresponding reference characters indicate corresponding parts throughout the several views of the drawings.

DETAILED DESCRIPTION OF THE PREFERRED EMBODIMENT

Figure 1:
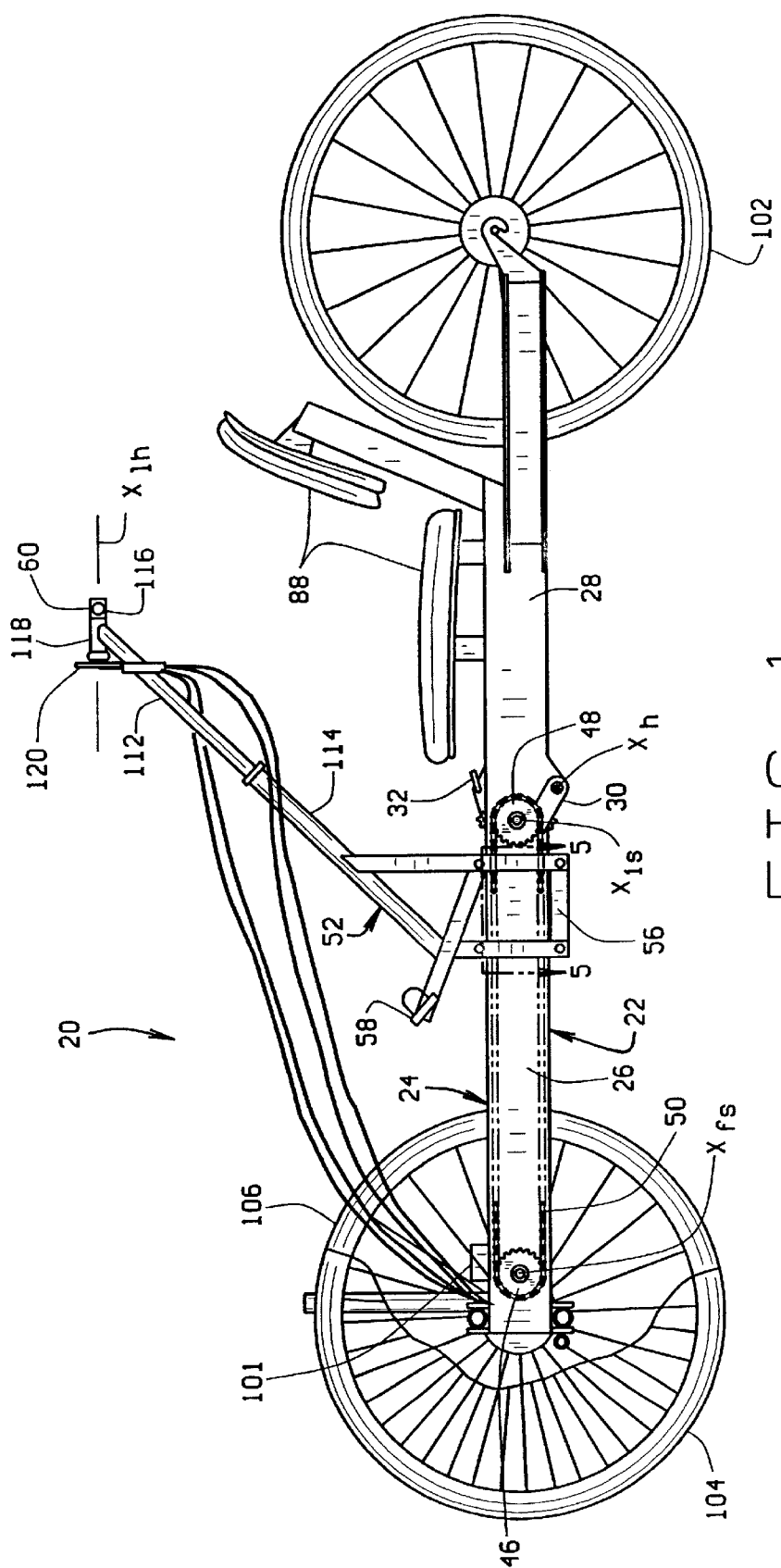
FIG. 1 is a left side elevational view of a human-powered exercise cycle of the present invention with portion's of a left front riding wheel broken away to show detail.
Figure 2:
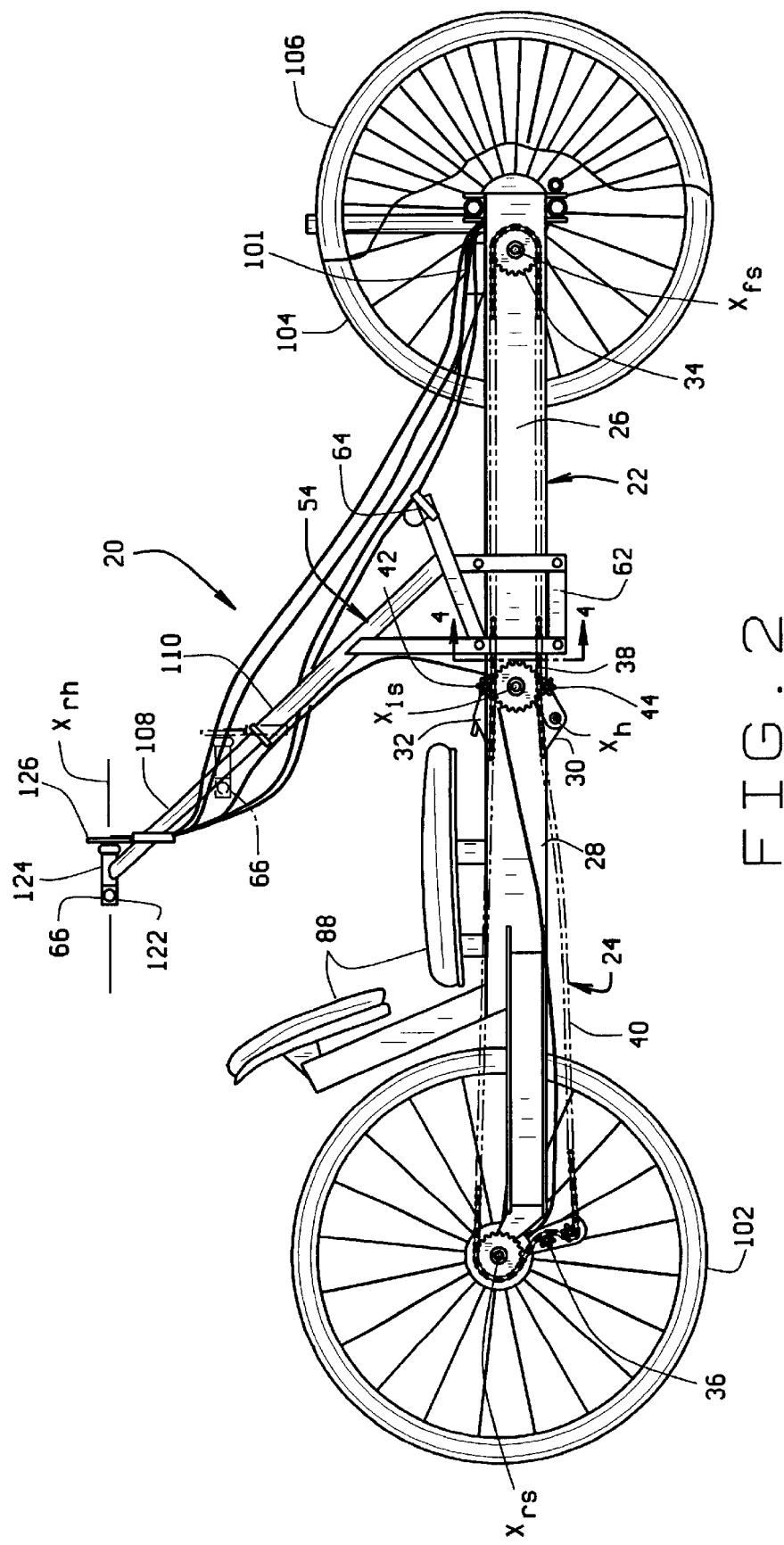
FIG. 2 is a right side elevational view of the exercise cycle of FIG. 1 with portions of a right front riding wheel broken away to show detail.

Referring now to the drawings and first more particularly to FIGS. 1 and 2, a human-powered exercise cycle of the present invention is indicated in its entirety by the reference numeral 20. The exercise cycle 20 comprises a frame, generally indicated at 22, and a drive mechanism, generally indicated at 24. As discussed in greater detail below, the frame 22 is foldable to simplify storage and transportation.

As also discussed in detail below, the drive mechanism 24 enables a user to power the exercise cycle 20 with reciprocating linear movement of the user's feet and hands. The exercise cycle 20 further includes a unique steering mechanism and a unique suspension system, both described in detail below. Many of the features described herein are applicable to stationary exercise cycles as well as to human-propelled vehicles (e.g., bicycles, tricycles, etc.). Many of the claims, following the description of the preferred embodiment, encompass both stationary exercise cycles as well as vehicles.

Figure 3:
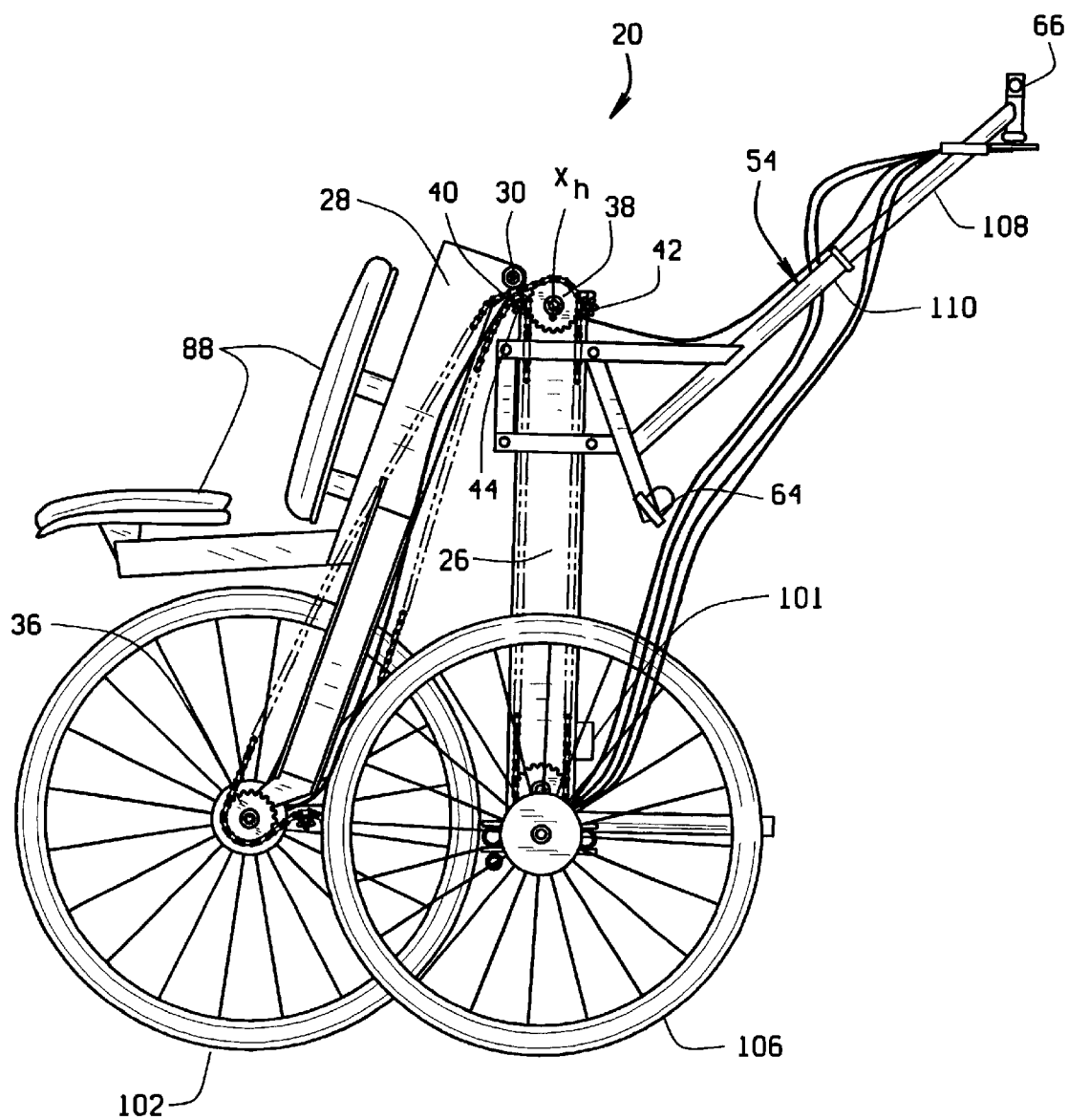
FIG. 3 is a right side elevational view of the exercise cycle of FIG. 2, but showing the frame folded to a stowable position.

The frame 20 includes a forward frame member 26 and a rearward frame member 28. As shown in FIGS. 1–3, a hinge 30 connects the forward frame member 26 to the rearward frame member such that the forward and rearward frame members are pivotally moveable relative to each other about a hinge axis $X_h$ (perpendicular to the page as shown in FIGS. 1–3) between an operable position (FIGS. 1 and 2) and a stowable position (FIG. 3). The cycle 20 is adapted to be in its operable position when being used by a user and is adapted to be in its stowed position for transportation or storage. Preferably, the frame 22 has a plurality of through holes for enabling a user to secure the cycle 20 to a bicycle carrier attached to an automobile or the like. Preferably, the hinge 30 is located on the underside of the frame members 26, 28 such that the frame members abut one another when the frame is in its operable position. The abutment prevents the frame members from pivoting downward beyond the operable position. Also preferably, the cycle 20 includes a quick-release frame lock mechanism 32 for releasably locking the frame members 26, 28 together in the operable position.

Referring still to FIGS. 1–3, the drive mechanism 24 comprises a forward transmission wheel (e.g., a right forward sprocket 34), a rearward transmission wheel (e.g., a rear sprocket 36), an intermediate transmission wheel (e.g., a right intermediate sprocket 38), and an endless loop assembly (e.g., a right-side endless-loop chain 40). Although the transmission wheels are described as sprockets and the endless loop assembly is described as a chain, it is to be understood that the wheels could be pulleys and the endless loop assembly could be a pulley. Also, the drive mechanism could be modified to replace the single right-side chain/belt with two or more chains or belts without departing from the scope of this invention.

The right forward sprocket 34 is keyed to a forward shaft which is journalled to the forward frame member 26 for rotation about a forward axis $X_{fs}$. The rear sprocket 36 is keyed to a rear shaft which is journalled to the rearward frame member 28 for rotation about a rear axis $X_{rs}$. The right intermediate sprocket 38 is keyed to an intermediate shaft which is preferably journalled to a rear portion of the forward frame member 26 for rotation about an intermediate axis $X_{is}$. The right-side endless loop chain 40 is trained around the right forward sprocket 34, the right intermediate sprocket 38 and the rear sprocket 36. Preferably, an upper idler sprocket 42 is connected to the forward frame member 26 above the right intermediate sprocket 38 and in engagement with the right-side chain 40, and a lower idler sprocket 44 is connected to the forward frame member below the right intermediate sprocket and in engagement with the right-side chain. The idler sprockets 42, 44 maintain the right-side chain in engagement with the left intermediate sprocket 48. As shown in FIG. 1, the drive mechanism 24 further includes a left forward sprocket 46 keyed to the forward shaft for rotation therewith about the forward axis $X_{fs}$, a left intermediate sprocket 48 keyed to the intermediate shaft for rotation therewith about the intermediate axis $X_{is}$, and a left-side endless loop chain 50 trained around the left forward sprocket and the left intermediate sprocket. Because the chains are trained around the sprockets, movement of either chain causes rotation of all of the sprockets and movement of the other chain.

As mentioned above, the frame members 26, 28 are moveable relative to each other between the operable position (FIGS. 1 and 2) and the stowable position (FIG. 3). Preferably, the hinge axis $X_h$, the forward axis $X_{fs}$, the intermediate axis $X_{is}$, and the rear axis $X_{rs}$ are all parallel or nearly parallel so that these axes remain parallel as the frame members 26, 28 are moved from the operable position (FIGS. 1 and 2) to the stowable position (FIG. 3). When the frame members 26, 28 are in the operable position, the forward axis $X_{fs}$ is a distance $D_o$ (FIG. 2) from the rear axis $X_{rs}$. When the frame members 26, 28 are in the stowable position, the forward axis $X_{fs}$ is a distance $D_s$ (FIG. 3) from the rear axis $X_{rs}$. The distance $D_s$ is less than the distance $D_o$, and is preferably less than half the distance $D_o$. The distance between the forward axis $X_{fs}$ and the intermediate axis $X_{is}$ remains constant as the frame members 26, 28 are moved between the operable and stowable positions. As shown in FIG. 3, the right-side chain 40 remains in engagement with the right forward sprocket 34, the right intermediate sprocket 38 and the rear sprocket 36 even when the frame members 26, 28 are: in the stowable position. The idler sprockets 44, 46 keep the right-side chain 40 relatively taut. Because of the configuration of the drive mechanism 24, neither chain 40, 50 needs to be removed to move the frame members 26, 28 between their operable and stowable positions.

Figure 4:
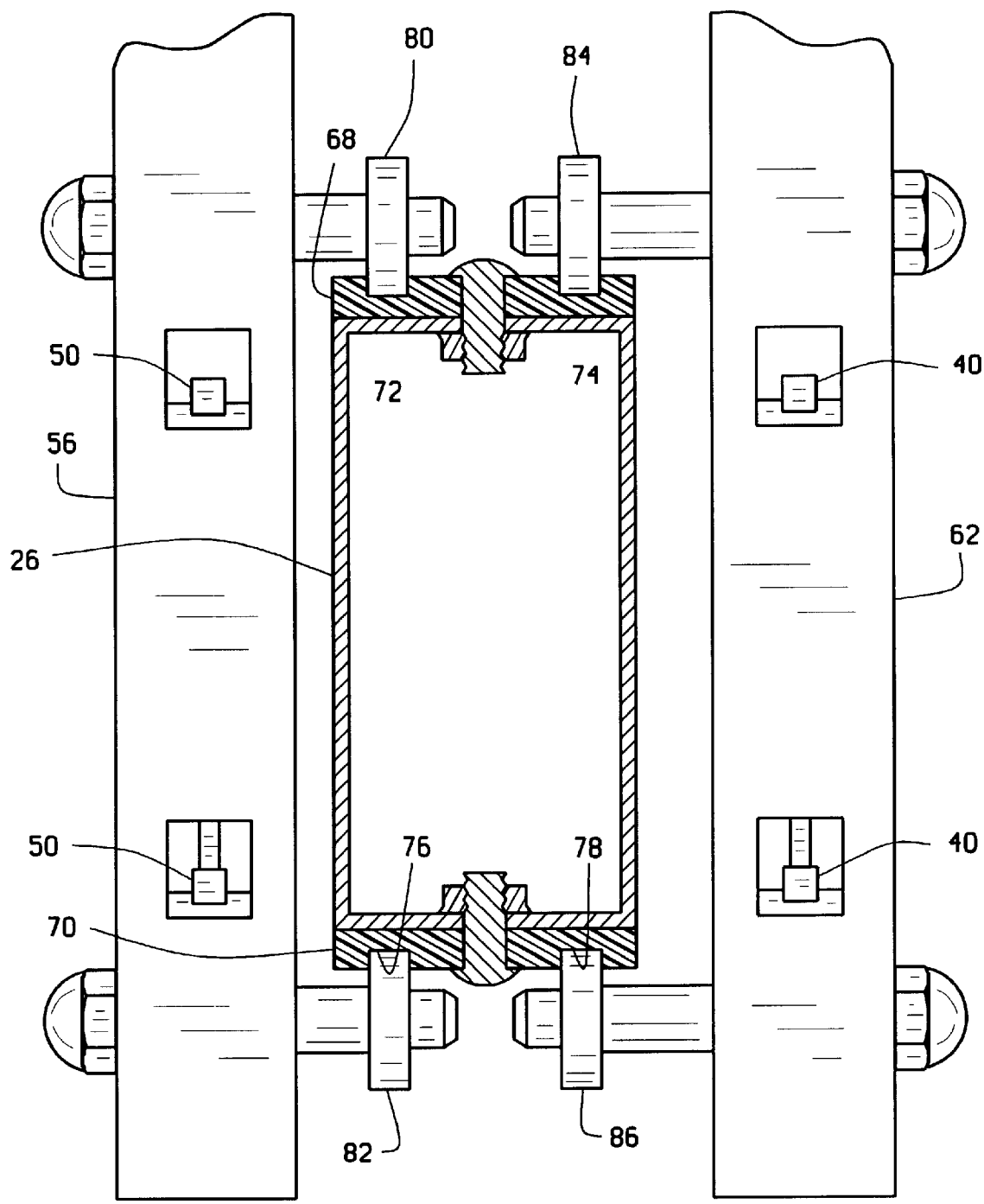
FIG. 4 is an enlarged cross-sectional view taken along the plane of line 4—4 of FIG. 2 showing left and right carriages of the linearly reciprocating assemblies configured for riding in tracks secured to the frame.
Figure 5:
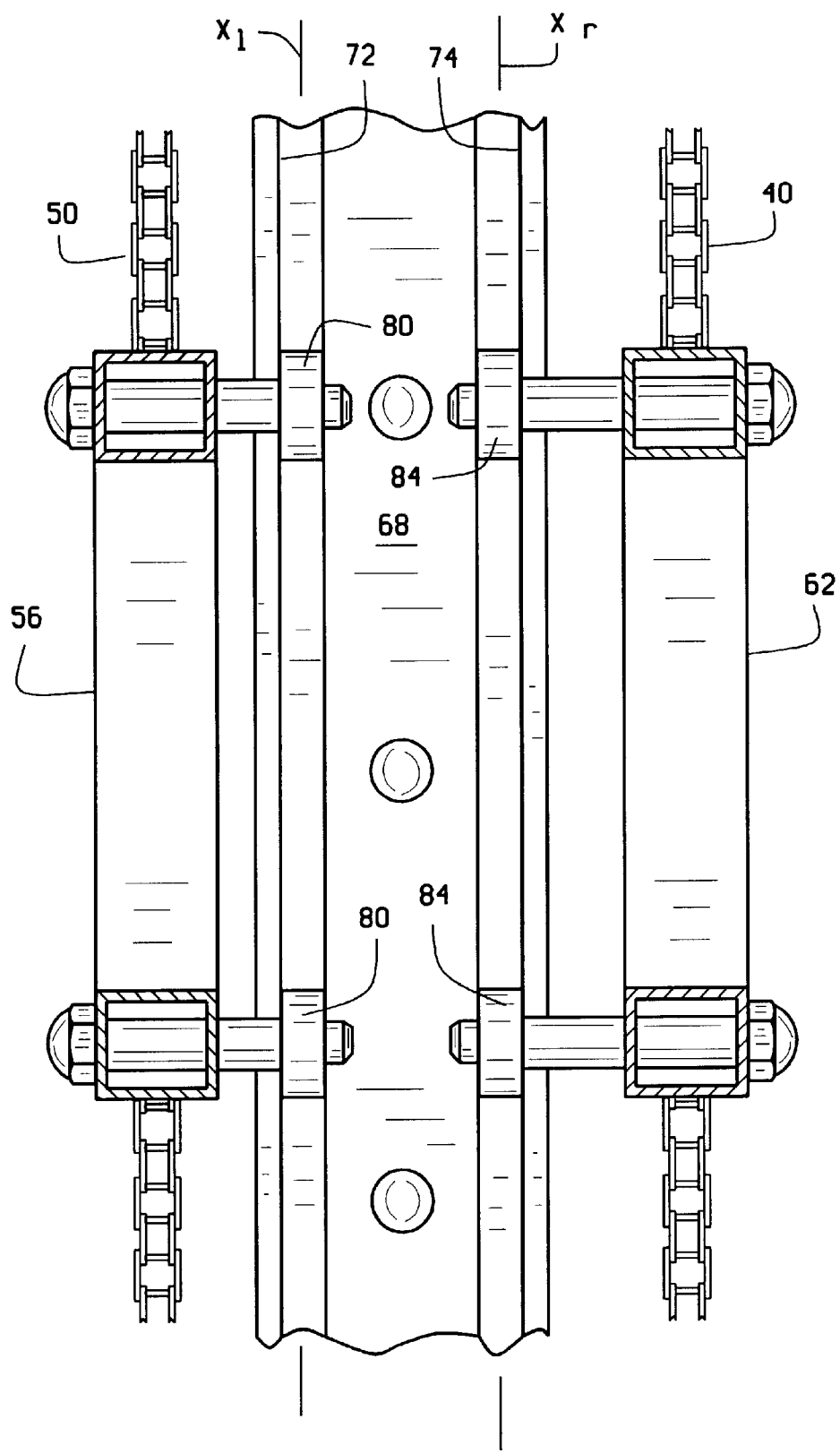
FIG. 5 is a cross-sectional view taken along the plane of line 5—5 of FIG. 1 showing the left and right carriages connected to the frame.
Figure 6:
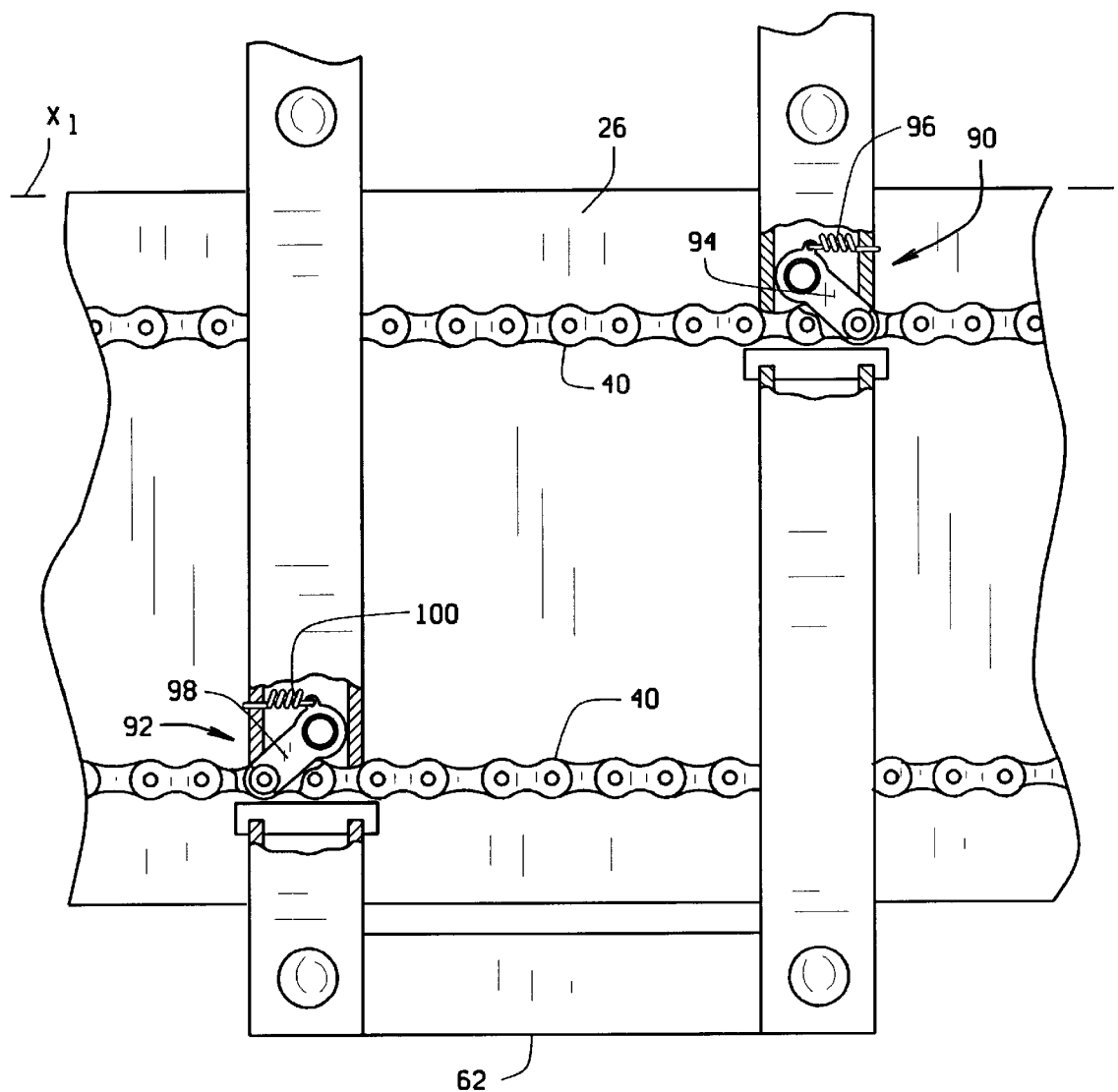
FIG. 6 is an enlarged fragmented side-elevational view of the right carriage with portions broken away to show details of clutch mechanisms of the right carriage.

Referring now to FIGS. 4–6 in combination with FIGS. 1 and 2, the left-side and right-side chains 40, 50 are moved via left and right linearly reciprocating assemblies, generally:indicated at 52, 54. The left linearly reciprocating assembly 52 comprises a left carriage 56, a left foot pedal 58, and a left handle 60. The right linearly reciprocating assembly 54 comprises a right carriage 62, a right foot pedal 64, and a right handle 66. As described below, the left and right linearly reciprocating assemblies are operatively mounted on the forward frame member 26 for linear reciprocating motion relative to the forward frame member. Preferably, the pedals 58, 64 are provided with toe clips or foot straps engageable with a user's feet for enabling the user to move the carriages 56, 62 both forwardly and rearwardly with his/her feet. The pedals may also include heel clips for securely holding the user's feet in the toe clips or foot straps.

As shown in FIG. 4, upper and lower track members 68, 70 are removably secured to upper and lower faces of the forward frame member 26. The upper track member 68 has left and right upwardly facing grooves 72, 74. The lower track member 70 has left and right downwardly facing grooves 76, 78. The left and right carriages 56, 52 are adapted and configured for riding along the left and right grooves of the upper and lower track members 68, 70. In particular, the left carriage 56 preferably includes a pair of upper rollers 80 sized and configured to roll in the left groove 72 of the upper track member 68, and a pair of lower rollers 82 (only one of which is shown in FIG. 4) sized and configured to roll in the left groove 76 of the lower track member 70. The left grooves 72, 76 of the upper and lower track members 68, 70 prevent lateral movement (i.e., right to left movement as viewed in FIG. 4) of the left carriage 56 relative to the forward frame member 26 while permitting longitudinal linear movement of the left carriage relative to the frame member along a longitudinal axis $X_l$. Likewise, the right carriage 62 preferably includes a pair of upper rollers 84 sized and configured to roll in the right groove 74 of the upper track member 68, and a pair of lower rollers 86 (only one of which is shown in FIG. 4) sized and configured to roll in the right groove 78 of the lower track member 70. The right grooves 74, 78 of the upper and lower track members 68, 70 prevent lateral movement (i.e., right to right movement as viewed in FIG. 4) of the right carriage 62 relative to the forward frame member 26 while permitting longitudinal linear movement of the right carriage relative to the frame member along a longitudinal axis $X_r$. Preferably, the upper and lower track members 68, 70 are removably attached to the forward frame member 26 to facilitate replacement of worn parts. However, it is to be understood that the forward frame member could alternatively be formed with upper and lower grooves without departing from the scope of this invention. Moreover, the longitudinal axes $X_l$ and $X_r$ are shown as being parallel and preferably are parallel. However, it is to be understood that longitudinal axes $X_l$ and $X_r$ need not be parallel to come within the scope of this invention.

The left foot pedal 58 and the left handle 60 are connected to and move with the left carriage 56 when the left carriage 56 moves relative to the forward frame member 26 along the axis $X_l$. The right foot pedal 64 and the right handle 66 are connected to and move with the right carriage 62 when the right carriage moves relative to the forward frame member 26 along the axis $X_r$. The exercise cycle 20 further includes a seat assembly 88 secured to the rearward frame member 28 for enabling a user to sit on the exercise cycle. Although not shown, it is to be understood that the seat assembly 88 may be adapted to adjustably slide relative to the frame from accommodating users of different heights. The left foot pedal 58 is engageable by the user's left foot and the left handle 60 is engageable by the user's left hand when the user is sitting on the seat assembly 88. The right foot pedal 64 is engageable by the user's right foot and the right handle 66 is engageable by the user's right hand when the user is sitting on the seat assembly. The left and right linearly reciprocating assemblies 52, 54 are configured such that the left handle 60 is spaced from the left foot pedal 58 and the right handle 66 is spaced from the right foot pedal 64. The spacing between the left handle 60 and the left foot pedal 58 is sufficient to enable the user to push or pull the left handle with the user's left hand to move the left reciprocating assembly 52 along the axis $X_l$ at the same time the user pushes or pulls the left foot pedal with the user's left foot to move the left reciprocating assembly along the axis $X_l$. The spacing between the right handle 66 and the right foot pedal 64 is sufficient to enable the user to push or pull the right handle with the user's right hand to move the right reciprocating assembly 54 along the axis $X_r$ at the same time the user pushes or pulls the right foot pedal with the user's right foot to move the left reciprocating assembly along the axis $X_r$.

Referring now to FIG. 6, the right carriage 62 preferably includes upper and lower clutch mechanisms 90, 92. The upper clutch mechanism 90 includes a pawl 94 and a tension spring 96. The pawl 94 is pivotally connected at its upper end to the right carriage 62 and the spring 96 urges the pawl in a clockwise direction (as viewed in FIG. 6) such that the pawl's lower end engages the right-side chain 40. Because of the angle of the pawl 94 it is configured to engage the chain only in one direction. As the right carriage 62 is moved in a forward direction (i.e., from left to right as viewed in FIG. 6) the pawl 94 of the upper clutch mechanism 90 engages a link of the upper reach of the right-side chain 40 in a manner such that the upper reach of the right side chain moves forward with the right carriage. As the right carriage 62 is moved in a rearward direction (i.e., from right to left as viewed in FIG. 6), the pawl 94 moves rearwardly along the upper reach. The lower clutch mechanism 92 includes a pawl 98 and a tension spring 100. The pawl 98 of the lower clutch mechanism 92 is pivotally connected at its upper end to the right carriage 62 and the spring 100 urges the pawl in a counterclockwise direction (as viewed in FIG. 6) such that the pawl's lower end engages the right-side chain 40. Because of the angle of the pawl 98 of the lower clutch mechanism 92, it is configured to engage the chain 40 only in one direction. As the right carriage 62 is moved in a rearward direction (i.e., from right to left as viewed in FIG. 6), the pawl 98 of the lower clutch mechanism 92 engages a link of the lower reach of the right-side chain 40 in a manner such that the lower reach of the right side chain moves rearward with the right carriage. As the right carriage 62 is moved in a forward direction (i.e., from right to left as viewed in FIG. 6), the pawl 98 moves rearwardly along the upper reach. Thus, forward movement of the right carriage 62 relative to the forward frame member 26 along the longitudinal axis $X_r$ causes the right-side chain 40 to move in a clockwise direction (as viewed in FIGS. 2 and 6) which causes clockwise rotation (as viewed in FIG. 2) of the right forward sprocket 34, the right intermediate sprocket 38, and the rear sprocket 36. Likewise, rearward movement of the right carriage 62 relative to the forward frame member 26 along the longitudinal axis $X_r$ causes the right-side chain 40 to move in a clockwise direction (as viewed in FIGS. 2 and 6) which causes clockwise rotation (as viewed in FIG. 2) of the tight forward sprocket 34, the right intermediate sprocket 38, and the rear sprocket 36.

Although not shown, it is to be understood that the left carriage 56 also preferably includes upper and lower clutch mechanisms. The clutch mechanisms of the left carriage 56 are similar to the clutch mechanisms 90, 92 of the right carriage 62. The clutch mechanisms of the left carriage 56 are configured and arranged such that both forward movement (right to left movement as viewed in FIG. 1) of the left carriage relative to the forward frame member 26 along the longitudinal axis Xl and rearward movement (left to right movement as viewed in FIG. 1) of the left carriage along the axis $X_l$ cause counterclockwise movement (as viewed in FIG. 1) of the left-side chain 50. This counterclockwise movement of the left-side chain 50 causes counterclockwise rotation (as viewed in FIG. 1) of the left forward sprocket 46 and the left intermediate sprocket 48. The left and right forward sprockets 46, 34 are both keyed to the forward shaft and therefore rotate together about the forward axis $X_{fs}$. The left and right intermediate sprockets 48, 38 are both keyed to the intermediate shaft and therefore rotate together about the intermediate axis $X_{is}$. Because the forward sprockets 46, 34 rotate together and the intermediate sprockets 48, 38 rotate together, both forward and rearward movement of the left carriage 56 along the longitudinal axis $X_l$ cause clockwise rotation (as viewed in FIG. 2) of the rear sprocket 36 about the rear axis $X_{rs}$. Preferably, a resilient stop 101 (FIG. 1) is releasably and adjustably secured to the forward frame member 26. The stop 101 limits forward motion of the carriages 56, 62.

The exercise cycle 20 further comprises a rotatable element rotatably mounted on the rearward frame member 28. As shown in FIGS. 1 and 2, the rotatable element comprises a rear riding wheel 102 rotatably connected to the rearward frame member 28 for rotation about a rear riding wheel axis.

As used herein, the term "riding wheel" means a wheel engageable with a riding surface, such as a road or path, for enabling an exercise cycle to roll along the riding surface. Preferably, the rear riding wheel 102 is coupled to the rear sprocket 36 in any suitable conventional manner such that forward rotation (i.e., clockwise rotation as viewed in FIG. 2) of the rear sprocket causes forward rotation of the rear riding wheel. Thus, the rear riding wheel 102 constitutes a driven riding wheel which is driven by the drive mechanism 24. As shown in FIGS. 1 and 2, the exercise cycle 20 further includes a left forward riding wheel 104 operatively connected to the forward frame member 26 for rotation about a left forward riding wheel axis and a right forward riding wheel 106 operatively connected to the forward frame member for rotation about a right forward riding wheel axis. Details about steering of and suspension for the forward riding wheels 104, 106 are discussed in greater detail below. The riding wheels 102, 104, 106 enable the exercise cycle 20 to roll along a riding surface.

Although the rotatable element has been described in connection with the preferred embodiment as being a riding wheel, it is to be understood that other rotatable elements could be employed without departing from the scope of this invention. For example, instead of a riding wheel, the rotatable element could be a flywheel of a stationary exercise cycle. In the case of a stationary exercise cycle, there would be no need for a riding wheel.

Because of the above-described characteristics of the drive mechanism 24, a user can cause rotation of the rear riding wheel 102 and thus propel the exercise cycle 20 forward by any movement of the left and/or right linearly reciprocating assemblies 52, 54. For example, the user can cause rotation of the rear riding wheel 102 by: (a) reciprocal movement of the left linearly reciprocating assembly 52 along the axis $X_l$ while maintaining the right linearly reciprocating assembly 54 still relative to the frame 22; (b) reciprocal movement of the right linearly reciprocating assembly along the axis $X_r$ while maintaining the left linearly reciprocating assembly still relative to the frame; (c) alternating movement of the left and right assemblies such that the left assembly moves forward while the right moves rearward and vice versa; (d) moving the left and right assemblies together such that the left and right assemblies move forward together and move rearward together.

Referring again to FIG. 2 the right carriage 62 comprises a right upper telescoping member 108 and a right lower telescoping member 110. The right handle 66 is operatively connected to the upper end of the right upper telescoping member 108, and the right foot pedal 64 is operatively connected to the right lower telescoping member 110. The right carriage 62 is adapted and configured for adjustable telescoping movement of the right upper telescoping member 112 relative to the right lower telescoping member 110 along a right carriage axis to move the right handle 66 between a raised position (shown in solid in FIG. 2) and a lowered position (shown in phantom in FIG. 2). Movement of the right handle 66 between its raised and lowered positions varies the distance between the right foot pedal 64 and the right handle 66 to accommodate users of different heights or otherwise enable the user to select a handle height which is most comfortable for him/her. As shown in FIG. 1, the left carriage 56 comprises a left upper telescoping member 112 and a left lower telescoping member 114. The left handle 60 is operatively connected to the upper end of the left upper telescoping member 112, and the left foot pedal 58 is operatively connected to the left lower telescoping member 114. The left carriage 56 is adapted and configured for adjustable telescoping movement of the left upper telescoping member 112 relative to the left lower telescoping member 114 along a left carriage axis to move the left handle 60 between a raised position (shown in solid in FIG. 1) and a lowered position (not shown in FIG. 1, but similar to the height of the lowered position of the right handle 66 shown in phantom in FIG. 2). Movement of the left handle 60 between its raised and lowered positions varies the distance between the left foot pedal 58 and the left handle to accommodate users of different heights or otherwise enable the user to select a handle height which is most comfortable for him/her.

Figure 7:
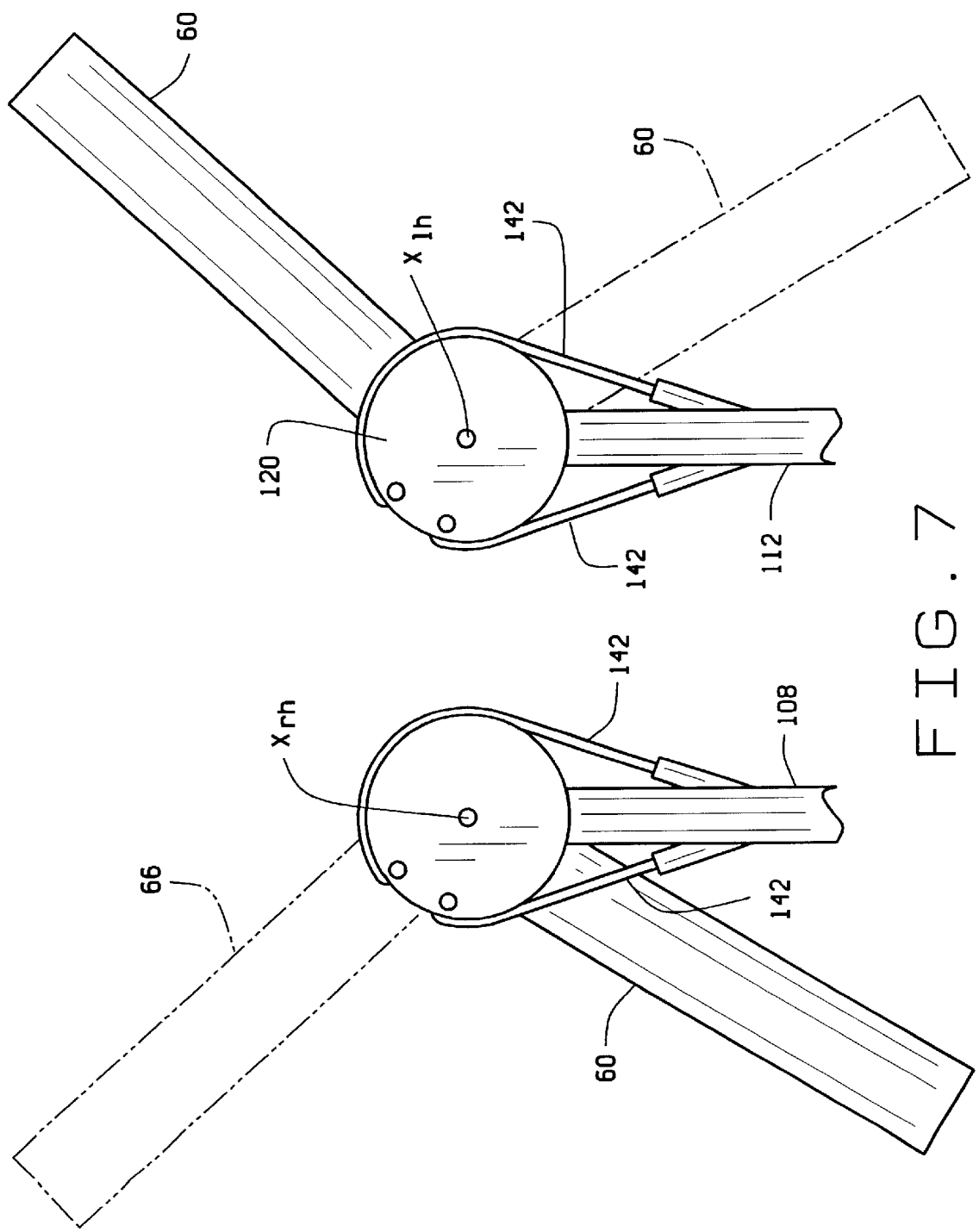
FIG. 7 is a fragmented front elevational view of the left and right handles of the linearly reciprocating assemblies of FIGS. 1 and 2.

Referring now to FIG. 7 in conjunction with FIGS. 1 and 2, the left and right handles 60, 66 are used to enable the user to steer the exercise cycle 20. The left handle 60 is operatively connected to the left carriage 56 in a manner such that the left handle is rotatably moveable relative to the left carriage about a left handle axis $X_{lh}$. In particular, the left handle 60 is fixed to a left forward extending shaft 116 (FIG. 1) which extends through a left tubular portion 118 fixed to the top of the left upper telescoping member 112. A left disc-shaped member 120 is fixed to a forward end of the left forward extending shaft. The left handle 60, left forward extending shaft 116 and left disc-shaped member 120 all rotate together about the handle axis $X_{lh}$. Preferably, the left handle axis $X_{lh}$ is generally parallel to the axis $X_l$. The right handle 66 is operatively connected to the right carriage 62 in a manner such that the right handle is rotatably moveable relative to the right carriage about a right handle axis $X_{rh}$. In particular, the right handle 66 is fixed to a right forward extending shaft 122 (FIG. 2) which extends through a right tubular portion 124 fixed to the top of the right upper telescoping member 108. A right disc-shaped member 126 is fixed to a forward end of the right forward extending shaft 122. The right handle 66, right forward extending shaft 122 and right disc-shaped member 126 all rotate together about the handle axis $X_{rh}$. Preferably, the right handle axis $X_{rh}$ is generally parallel to the axis $X_r$.

Referring to FIGS. 8–11, the left and right forward riding wheels 104, 106 are operatively connected to the forward frame member 26 via a front suspension, generally indicated at 128. The front suspension 128 includes a laterally extending upper bar 130 connected to an upper portion of the forward frame member 26, a laterally extending lower bar 132 connected to a lower portion of the forward frame member, a left wheel mount 134, a right wheel mount 136, and a tie rod 138. The left wheel mount 134 is connected to left ends of upper and lower bars 130, 132 via upper and lower mono-ball connectors. The left forward riding wheel 104 is rotatably connected to a left shaft which is fixed to and extends laterally from the left wheel mount 134. The left shaft supports the left forward riding wheel 104 for rotation about a left forward riding wheel axis $X_{lw}$. The right wheel mount 136 is connected to right ends of the upper and lower bars 130, 132 via upper and lower mono-ball connectors. The right forward riding wheel 106 is rotatably connected to a right shaft which is fixed to and extends laterally from the right wheel mount 136. The right shaft supports the right forward riding wheel 106 for rotation about a right forward riding wheel axis $X_{rw}$. The mono-ball connectors enable the left wheel mount 134 and the left forward riding wheel 104 to turn about a generally vertical left wheel turning axis $X_{lt}$ and enable the right wheel mount 136 and the right forward riding wheel 106 to turn about a generally vertical right wheel turning axis $X_{rt}$. The mono-ball connectors also enable the wheel mounts 134, 136 and forward riding wheels 104, 106 to tilt relative to the upper and lower bars 130, 132 in a manner discussed in greater detail below. The tie rod 138 is connected at one end to the left wheel mount 134 and connected at its other end to the right wheel mount 136. Lateral movement of the tie rod 138 relative to the upper and lower bars 130, 132 causes the forward riding wheels to turn about their turning axes $X_{lt}$, $X_{rt}$.

Figure 9:
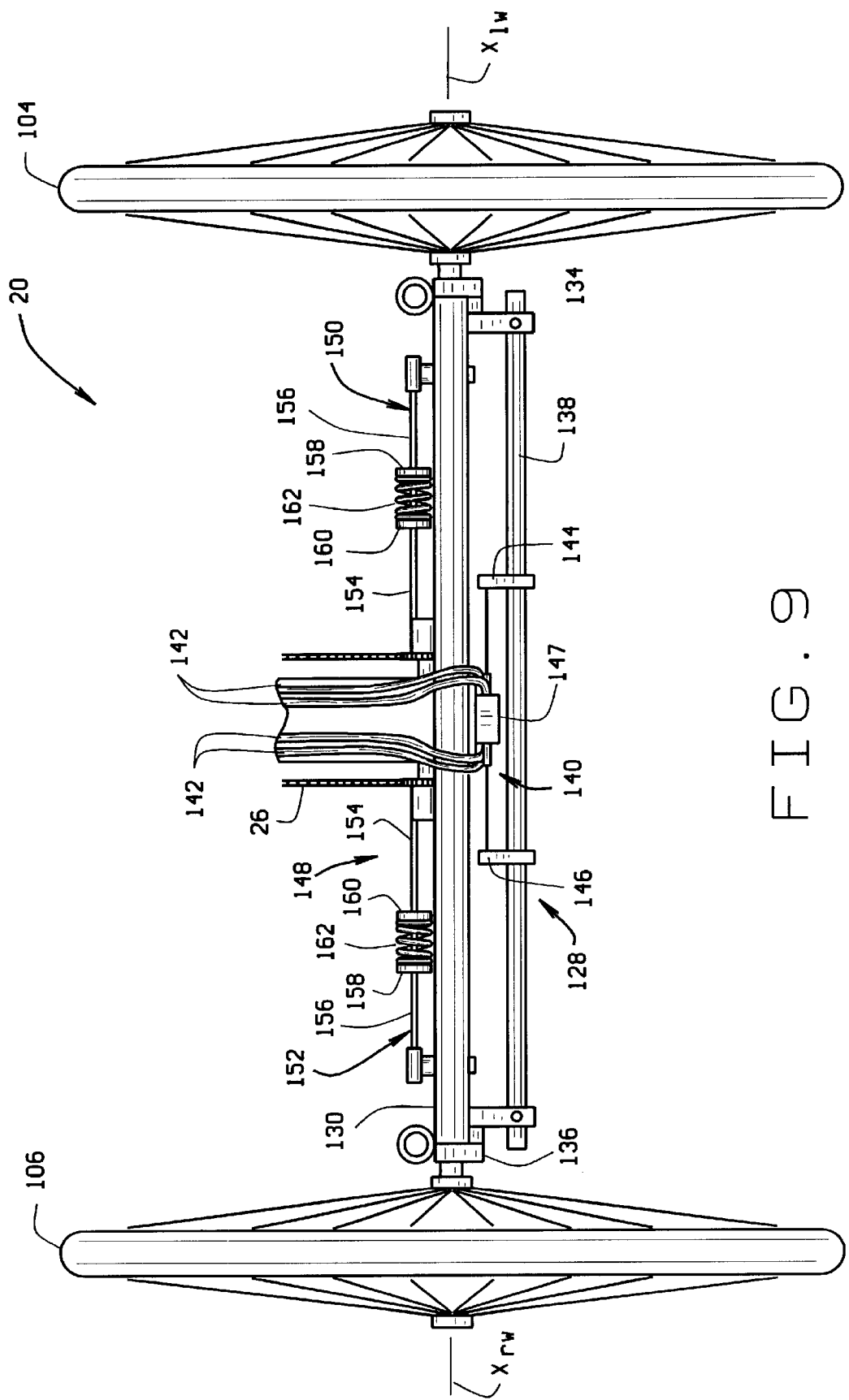
FIG. 9 is a fragmented top elevational view of the steering mechanism and suspension of FIG. 8.
Figure 10:
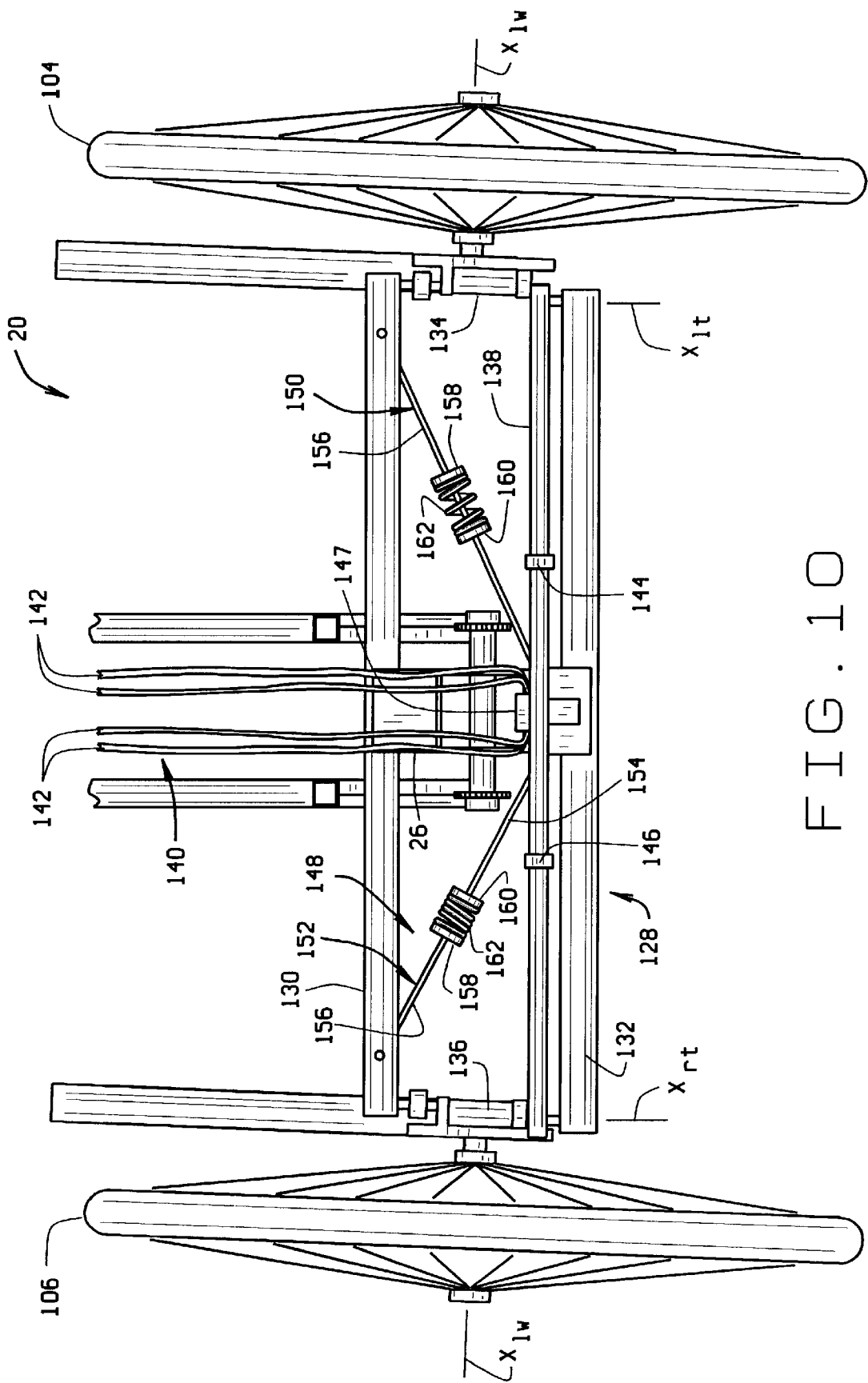
FIG. 10 is a fragmented front elevational view similar to that of FIG. 8 but showing the front riding wheels in a slanted orientation.
Figure 11:
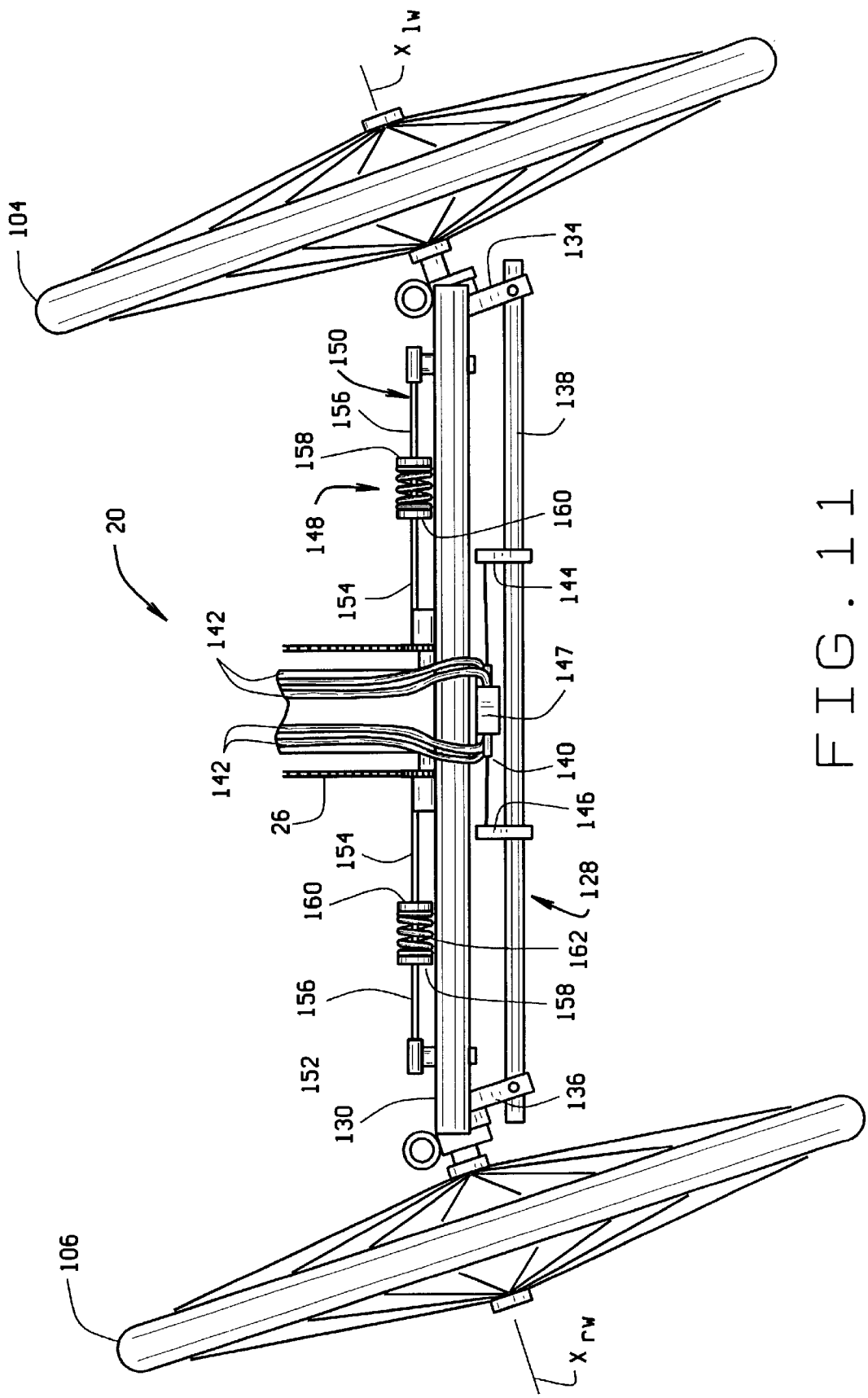
FIG. 11 is a fragmented top elevational view similar to that of FIG. 9 but showing the front riding wheels in a turned position.

Referring to FIGS. 7, 9 and 11, the exercise cycle 20 preferably includes a steering mechanism, generally indicated at 140, for converting rotational movement of the left and right handles 60, 66 about the handle axes $X_{lh}$, $X_{rh}$ into lateral movement of the tie rod 138 relative to the forward frame member 26 to cause the forward riding wheels 104, 106 to turn about the turning axes $X_{lt}$, $X_{rt}$. The steering mechanism 140 preferably includes four sleeved cables 142. Each cable 142 has a handle end connected to the disc-shaped members 120, 126 and a tie rod end connected to the tie rod 138. Two of the cables 142 are connected at their handle ends to the left disc-shaped member 120 and connected at their tie rod ends to left and right tie rod connectors 144, 146. The other two cables 142 are connected at their handle ends to the right disc-shaped member 126 and connected at their tie rod ends to the left and right tie rod connectors 144, 146. As shown in FIG. 7, the sleeve ends nearest the handle ends are secured to the left and right upper telescoping members 112, 108 so that turning of the handles 60, 66 about the handle axes $X_{lh}$, $X_{rh}$ cause the cables 142 to slide relative to their sleeves. As shown in FIGS. 9–11, the sleeve ends nearest the tie rod ends are secured to a connector block 147 fixed to the front end of the forward frame member 26. The tie rod ends of the cables 142 extend through holes in the connector block. Because the sleeves are secured to the connected block, turning of the handles 60, 66 about the handle axes $X_{lh}$, $X_{rh}$ cause the tie rod ends of the cables 142 to move relative to the sleeves. The steering mechanism 140 is configured such that turning the handles 60, 66 about the handle axes $X_{lh}$, $X_{rh}$ to the position shown in solid in FIG. 7 causes the forward riding wheels to turn about the turning axes $X_{lt}$, $X_{rt}$ to the right, and turning of the handles to the position shown in phantom in FIG. 7 causes the forward riding wheels to turn to the left position shown in FIG. 11. Although not shown, it is to be understood that that handles 60, 66 are preferably generally horizontal when the exercise cycle 20 is rolling forward along a straight horizontal line. Also preferably, the left and right forward riding wheel axes $X_{lw}$, $X_{rw}$ are substantially aligned when the exercise cycle 20 is rolling forward along a straight horizontal line.

Although the steering mechanism 140 has been described as being a cable system, it is to be understood that other systems could be employed without departing from the scope of this invention. For example, the steering mechanism could be hydraulic system for converting rotational movement of the handles into lateral movement of the tie rod.

Figure 8:
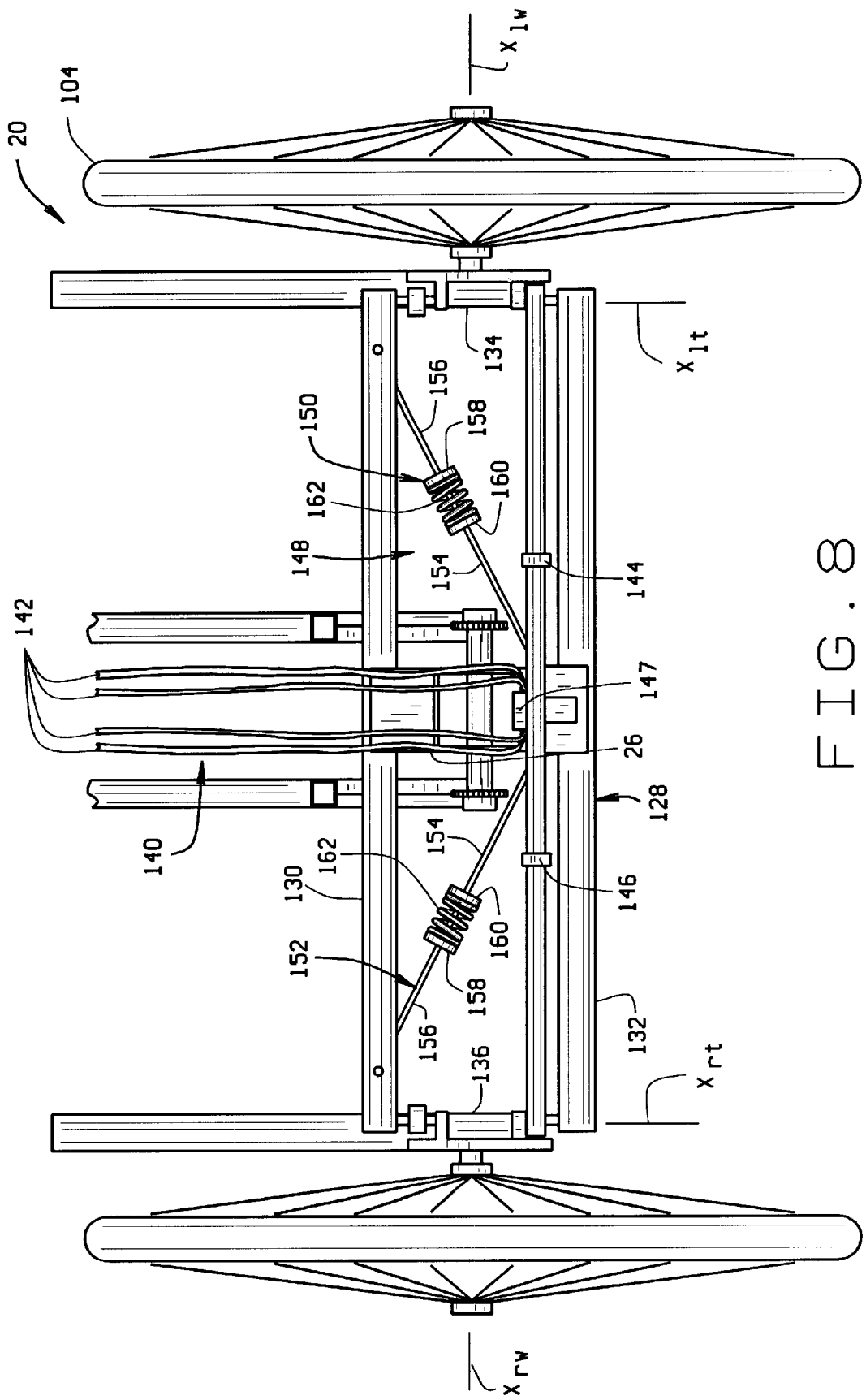
FIG. 8 is a fragmented front elevational view of the cycle of FIGS. 1 and 2 showing the cycle's steering mechanism and suspension.

Referring to FIGS. 8 and 10, the upper bar 130 is pivotally connected at its center to the forward frame member 26 to enable the upper bar to pivot slightly relative to the forward frame member in a generally vertical plane. Likewise, the lower bar 132 is pivotally connected at its center to the forward frame member 26 to enable the lower bar to pivot slightly relative to the forward frame member in a generally vertical plane. The bars 130, 132 and the wheel mounts 134, 136 form a parallelogram. Because of the mono-ball connectors and the left and right wheel mounts 134, 136, the upper and lower bars 130, 132 remain parallel to one another and the wheel mounts remain parallel to one another but the wheel mounts and the forward riding wheels 104, 106 may tilt relative to the bars. This configuration enables the forward riding wheels to be moveable between upright positions (i.e., positions in which the riding wheel axes $X_{lw}$, $X_{rw}$ are generally parallel to the riding surface with the riding wheels in contact with the riding surface) and slanted positions (i.e., positions in which the riding wheel axes $X_{lw}$, $X_{rw}$ are slanted with respect to the riding surface with the riding wheels in contact with the riding surface). This configuration also keeps the forward riding wheels from slanting relative to the upper frame member 26. Thus, the forward riding wheels are in a slanted position only when the forward frame member is in a slanted position.

The exercise cycle 20 further includes a spring mechanism, generally indicated at 148, configured and adapted for biasing the forward riding wheels 104, 106 in their upright positions. The spring mechanism 148 comprises a left spring assembly 150 and a right spring assembly 152. Each spring assembly 150, 152 has a lower rod 154, an upper rod 156, an upper disc member 158, a lower disc member 160, and a compression spring 162. The lower rod 154 is connected at its lower end to the forward frame member 26 and connected at its upper end to the upper disc member 158. The lower rod 154 extends through a hole (not shown) through the lower disc member 160 and through the central region of the compression spring 162. The upper rod 156 is connected at its upper end to the upper bar 130 and connected at its lower end to the lower disc member 160. The upper rod 156 extends through a hole (not shown) through the upper disc member 158 and through the central region of the compression spring 162. Preferably, the rods 154 of the left spring assembly 150 are parallel to each other but offset so that they do not contact one another. Likewise, the rods 154 of the right spring assembly 152 are parallel to each other but offset so that they do not contact one another. If it is desired to maintain the rods in an aligned condition, one of the rods could be replaced with a tube and the remaining rod could extend into the tube. When the forward riding wheels 104, 106 are slanted to the left as shown in FIG. 10, the spring 162 of the right spring assembly is compressed. When the forward riding wheels 104, 106 are slanted to the right (not shown), the spring 162 of the left spring assembly 150 is compressed. The compression springs 162 push against the upper and lower disc members 158, 160 in a manner to urge the upper bar 130 to a position which is perpendicular (i.e., not slanted) relative to the forward frame member. Thus, the spring mechanism 148 biases the forward riding wheels 104, 106 to their upright positions.

Although not shown, it is to be understood that the exercise cycle 20 further includes a hand braking system. The braking system may include caliper brakes, disc brakes or any other conventional brakes.

In view of the above, it will be seen that the several objects of the invention are achieved and other advantageous results attained.

As various changes could be made in the above constructions and methods without departing from the scope of the invention, it is intended that all matter contained in the above description or shown in the accompanying drawings shall be interpreted as illustrative and not in a limiting sense.

What is claimed is:

1. A foldable exercise cycle comprising:
    a frame having a forward frame member and a rearward frame member;
    a hinge operatively connecting the forward frame member to the rearward frame member such that the forward and rearward frame members are pivotally moveable relative to each other about a hinge axis between operable and stowable positions; and
    a drive mechanism comprising a forward transmission wheel, a rearward transmission wheel, and an endless loop assembly, one of the forward and rearward transmission wheels constituting a driven transmission wheel;
    the forward transmission wheel being operatively connected to the forward frame member for rotational movement about a forward axis;
    the rearward transmission wheel being operatively connected to the rearward frame member for rotational movement about a rearward axis;
    the endless loop assembly being trained around the forward and rearward transmission wheels such that movement of one of the forward transmission wheel, rearward transmission wheel, and endless loop assembly causes movement of the other two of the forward transmission wheel, rearward transmission wheel, and endless loop assembly;
    the forward transmission wheel being a distance $D_o$ from the rearward transmission wheel when the frame members are in their operable position, the forward transmission wheel being a distance $D_s$ from the rearward transmission wheel when the frame members are in their stowed position, the distance $D_s$ being less than the distance $D_o$;
    the endless loop assembly and frame members being configured and adapted such that the endless loop assembly remains trained around the forward and rearward transmission wheels as the frame members are moved between the operable and stowable positions.

2. A foldable exercise cycle as set forth in claim 1 wherein the forward axis, rearward axis, and hinge axis are all generally parallel to one another.

3. A foldable exercise cycle as set forth in claim 2 further comprising an intermediate transmission wheel operatively connected to one of the frame members for rotation about an intermediate axis, the intermediate axis being generally parallel to the forward and rearward axes, the intermediate transmission wheel being adjacent the hinge and engaging the endless loop assembly, the intermediate transmission wheel being adapted to remain in engagement with the endless loop assembly when the frame members are moved between their operable and stowable positions.

4. A foldable exercise cycle as set forth in claim 3 wherein the endless loop assembly comprises at least one endless loop member, the exercise cycle further comprising an idler transmission wheel adjacent the intermediate transmission wheel with the endless loop member passing between the transmission idler wheel and the transmission intermediate wheel, the idler wheel being configured and adapted to maintain the endless loop member in engagement with the transmission intermediate wheel when the frame members are moved between their operable and stowable positions.

5. A foldable exercise cycle as set forth in claim 3 wherein the distance $D_s$ is less than half the distance $D_o$.

6. A foldable exercise cycle as set forth in claim 1 wherein the forward transmission wheel comprises a forward sprocket, the rearward transmission wheel comprises a rearward sprocket, and the endless loop member comprises at least one chain.

7. A foldable exercise cycle as set forth in claim 6 wherein the at least one chain is trained around the forward and rearward sprockets.

8. A foldable exercise cycle as set forth in claim 1 further comprising:
- at least one forward riding wheel operatively connected to the forward frame member for rotation relative to the forward frame member about a forward riding wheel axis and at least one rear riding wheel operatively connected to the rearward frame member for rotation relative to the rearward frame member about a rear riding wheel axis, the riding wheels being engageable with a riding surface, such as a road, for enabling the exercise cycle to roll along the riding surface, at least one of the forward and rear riding wheels being operatively connected to the driven transmission wheel such that rotation of the driven transmission wheel causes rotation of the driven wheel;
- left and right linearly reciprocating assemblies, the left reciprocating assembly being operatively mounted on the frame for linear reciprocating motion relative to the frame along an axis $X_l$, the right reciprocating assembly being operatively mounted on the frame for linear reciprocating motion relative to the frame along an axis $X_r$, the left reciprocating assembly being operatively connected to the endless loop assembly such that motion of the left reciprocating assembly relative to the frame along the axis $X_l$ causes movement of the endless loop assembly to thereby drive the driven transmission wheel.

9. A foldable exercise cycle as set forth in claim 8 wherein motion of the left reciprocating assembly relative to the frame along the axis $X_l$ and motion of the right reciprocating assembly relative to the frame along the axis $X_r$ causes movement of the exercise cycle in a forward direction, the axis $X_l$ and $X_r$ being generally parallel to the forward direction.

10. A foldable exercise cycle as set forth in claim 8 wherein:
- the left reciprocating assembly comprises a left carriage movable along the axis $X_l$, a left foot pedal engageable by a user's left foot, and a left handle engageable by a user's left hand, the left foot pedal and the left handle being operatively connected to the left carriage such that the left foot pedal and the left handle move together with the carriage when the left carriage is moved A along the axis $X_l$, the left handle being spaced from the left foot pedal in a manner to enable the user to push or pull the left handle with the user's left hand to move the left reciprocating assembly along the axis $X_l$ at the same time the user pushes or pulls the left foot pedal with the user's left foot to move the left reciprocating assembly along the axis $X_l$;
- the right reciprocating assembly comprises a right carriage movable along the axis $X_r$, a right foot pedal engageable by a user's right foot, and a right handle engageable by a user's right hand, the right foot pedal and the right handle being operatively connected to the right carriage such that the right foot pedal and the right handle move together with the carriage when the right carriage is moved along the axis $X_r$, the right handle being spaced from the right foot pedal in a manner to enable the user to push or pull the right handle with the user's right hand to move the right reciprocating assembly along the axis $X_r$ at the same time the user pushes or pulls the right foot pedal with the user's right foot to move the right reciprocating assembly along the axis $X_r$.

11. A method comprising:
providing a foldable exercise cycle as set forth in claim 10;
applying foot pressure to the left foot pedal;
applying hand pressure to the left handle;
applying foot pressure to the right foot pedal;
applying hand pressure to the right handle;
the steps of applying foot pressure to the left foot pedal and applying hand pressure to the left handle occurring simultaneously and in a manner to move the left carriage along the axis $X_l$;
the steps of applying foot pressure to the right foot pedal and applying hand pressure to the right handle occurring simultaneously and in a manner to move the right carriage along the axis $X_r$.

12. A foldable exercise cycle as set forth in claim 10 wherein:
- the left reciprocating assembly is configured to enable the user to adjust the spacing between the left handle and the left foot pedal to accommodate users of different heights; and
- the right reciprocating assembly is configured to enable the user to adjust the spacing between the right handle and the right foot pedal to accommodate user of different heights.

13. A method comprising:
providing a foldable exercise cycle as set forth in claim 12;
adjusting the spacing between the left handle and the left foot pedal of the left reciprocating assembly; and
adjusting the spacing between the right handle and the right foot pedal of the right reciprocating assembly.

14. A foldable exercise cycle as set forth in claim 10 wherein:
- the left handle is operatively connected to the left carriage in a manner such that the left handle is rotatably moveable relative to the left carriage about a left handle axis, the left handle axis being generally parallel to the axis $X_l$; and
- the right handle is operatively connected to the right carriage in a manner such that the right handle is rotatably moveable relative to the right carriage about a right handle axis, the right handle axis being generally parallel to the axis $X_r$.

15. A foldable exercise cycle as set forth in claim 14 further comprising a steering mechanism having a first portion operatively connected to the forward riding wheel and a second portion operatively connected to one of the left and right handles, the steering mechanism being adapted and configured such that the steering mechanism causes movement of said one of the left and right handles relative to its corresponding carriage about its corresponding handle axis to result in turning of the forward riding wheel relative to the forward frame member to thereby vary the position of the forward riding wheel axis relative to the forward frame member.

16. An exercise cycle comprising:
a frame;
a left linearly reciprocating assembly operatively mounted on the frame for linear reciprocating motion relative to the frame along an axis $X_l$, the left reciprocating assembly comprises a left carriage movable along the axis $X_l$, a left foot pedal engageable by a user's left foot, and a left handle engageable by a user's left hand, the left foot pedal and the left handle being operatively connected to the left carriage such that the left foot pedal and the left handle move together with the carriage when the left carriage is moved along the axis $X_l$, the left handle being spaced from the left foot pedal in a manner to enable the user to push or pull the left handle with the user's left hand to move the left reciprocating assembly along the axis $X_l$ at the same time the user pushes or pulls the left foot pedal with the user's left foot to move the left reciprocating assembly along the axis $X_l$;

a right linear reciprocating assembly operatively mounted on the frame for linear reciprocating motion relative to the frame along an axis $X_r$, the right reciprocating assembly comprises a right carriage movable along the axis $X_r$, a right foot pedal engageable by a user's right foot, and a right handle engageable by a user's right hand, the right foot pedal and the right handle being operatively connected to the right carriage such that the right foot pedal and the right handle move together with the carriage when the right carriage is moved along the axis $X_r$, the right handle being spaced from the right foot pedal in a manner to enable the user to push or pull the right handle with the user's right hand to move the right reciprocating assembly along the axis $X_r$ at the same time the user pushes or pulls the right foot pedal with the user's right foot to move the right reciprocating assembly along the axis $X_r$;

a rotatable element operatively mounted on the frame for rotation relative to the frame about a rotatable element axis; and a drive mechanism operatively connected to the left and right linear reciprocating members and operatively connected to the rotatable element, the drive mechanism being adapted and configured for converting linear reciprocating motion of the left and right linear reciprocating members to rotational motion of the rotatable element about the rotatable element axis.

17. An exercise cycle as set forth in claim 16 further comprising at least one forward riding wheel operatively connected to the frame for rotation relative to the frame about a forward riding wheel axis and at least one rear riding wheel operatively connected to the frame for rotation relative to the frame about a rear riding wheel axis, the riding wheels being engageable with a riding surface, such as a road, for enabling the cycle to roll along the riding surface, one of the forward and rear riding wheels constituting the rotatable element.

18. An exercise cycle as set forth in claim 17 wherein motion of the left reciprocating assembly relative to the frame along the axis $X_l$ and motion of the right reciprocating assembly relative to the frame along the axis $X_r$ causes movement of the cycle in a forward direction, the axis $X_l$ and $X_r$ being generally parallel to the forward direction.

19. An exercise cycle as set forth in claim 17 wherein:
the left handle is operatively connected to the left carriage in a manner such that the left handle is rotatably moveable relative to the left carriage about a left handle axis, the left handle axis being generally parallel to the axis $X_l$; and
the right handle is operatively connected to the right carriage in a manner such that the right handle is rotatably moveable relative to the right carriage about a right handle axis, the right handle axis being generally parallel to the axis $X_r$.

20. An exercise cycle as set forth in claim 19 further comprising a steering mechanism having a first portion operatively connected to the forward riding wheel and a second portion operatively connected to one of the left and right handles, the steering mechanism being adapted and configured such that the steering mechanism causes movement of said one of the left and right handles relative to its corresponding carriage about its corresponding handle axis to result in turning of the forward riding wheel relative to the frame to thereby vary the position of the forward riding wheel axis relative to the frame.

21. An exercise cycle as set forth in claim 17 wherein the forward riding wheel constitutes a left forward riding wheel and wherein the forward riding wheel axis constitutes a left forward riding wheel axis, the cycle further comprising a right forward riding wheel operatively connected to the frame for rotation relative to the frame about a right forward riding wheel axis, the left and right forward riding wheel axes lying generally along the same line when the cycle is rolling forward along a straight line.

22. An exercise cycle as set forth in claim 21 wherein the left and right forward riding wheels are operatively connected to the frame in a manner to enable the left and right forward riding wheels to be moveable between upright positions and slanted positions, the left and right forward riding wheel axes being generally parallel to the riding surface and the forward riding wheels being in contact with the riding surface when the forward riding wheels are in their upright positions, the left and right forward riding wheel axes being generally slanted relative to riding surface and the forward riding wheels being in contact with the riding surface when the forward riding wheels are in their slanted positions, the exercise cycle further comprising a spring mechanism configured and adapted for biasing the forward riding wheels in their upright position.

23. An exercise cycle as set forth in claim 16 wherein:
the left reciprocating assembly is configured to enable the user to adjust the spacing between the left handle and the left foot pedal to accommodate users of different heights; and
the right reciprocating assembly is configured to enable the user to adjust the spacing between the right handle and the right foot pedal to accommodate user of different heights.

24. An exercise cycle as set forth in claim 23 wherein:
the left carriage comprises a left upper telescoping member and a left lower telescoping member, the left handle being operatively connected to the left upper telescoping member, the left foot pedal being operatively connected to the left lower telescoping member, the left carriage being adapted and configured for adjustable telescoping movement of the left upper telescoping member relative to the left lower telescoping member along a left carriage axis to vary the distance between the left foot pedal and the left handle, the left carriage axis being slanted relative to the axis $X_l$;
the right carriage comprises a right upper telescoping member and a right lower telescoping member, the right handle being operatively connected to the right upper telescoping member, the right foot pedal being operatively connected to the right lower telescoping member, the right carriage being adapted and configured for adjustable telescoping movement of the right upper telescoping member relative to the right lower telescoping member along a right carriage axis to vary the distance between the right foot pedal and the right handle, the right carriage axis being slanted relative to the axis $X_r$.

25. A method comprising:
providing an exercise cycle as set forth in claim 23;
adjusting the spacing between the left handle and the left foot pedal of the left reciprocating assembly; and adjusting the spacing between the right handle and the right foot pedal of the right reciprocating assembly.

26. An exercise cycle as set forth in claim 17 wherein:

the left carriage is adapted and configured for moving forwardly and rearward relative to the frame along the axis $X_l$;

the right carriage is adapted and configured for moving forwardly and rearward relative to the frame along the axis $X_r$;

the left carriage and drive mechanism are adapted and configured such that forward movement of the left carriage relative to the frame along the axis $X_l$ causes rotation of the rotatable element about the rotatable element axis and such that rearward movement of the left carriage relative to the frame along the axis $X_l$ causes rotation of the rotatable element about the rotatable element axis; and the right carriage and drive mechanism are adapted and configured such that forward movement of the right carriage relative to the frame along the axis $X_r$ causes rotation of the rotatable element about the rotatable element axis and such that rearward movement of the right carriage relative to the frame along the axis $X_r$ causes rotation of the rotatable element about the rotatable element axis.

27. An exercise cycle as set forth in claim 26 wherein:

the drive mechanism comprises a forward transmission wheel, a rearward transmission wheel, and an endless loop member, the forward transmission wheel being operatively connected to the frame for rotational movement about a forward axis, the rearward transmission wheel being operatively connected to the frame for rotational movement about a rearward axis, the endless loop member being trained around the forward and rearward transmission wheels such that movement of the endless loop member causes rotation of the forward and rearward transmission wheels about the forward and rearward axes, respectively, the endless loop member having an upper reach extending between the forward and rearward transmission wheels and a lower reach extending between the forward and rearward transmission wheels;

one of the left and right carriages having first and second clutch mechanisms, the first clutch mechanism being moveable between a lock position and a release position, the first clutch mechanism being adapted and configured to lock against one of the upper and lower reaches only when said one carriage is moved forwardly relative to the frame, the second clutch mechanism being adapted and configured to lock against the other of the upper and lower reaches only when said one carriage is moved rearwardly relative to the frame, whereby forward movement of said one carriage relative to the frame and rearward movement of said one carriage relative to the frame both cause rotation of the rotatable element about the rotatable element axis.

28. A method comprising:

providing an exercise cycle as set forth in claim 16;

applying foot pressure to the left foot pedal;

applying hand pressure to the left handle;

applying foot pressure to the right foot pedal;

applying hand pressure to the right handle;

the steps of applying foot pressure to the left foot pedal and applying hand pressure to the left handle occurring simultaneously and in a manner to move the left carriage along the axis $X_l$;

the steps of applying foot pressure to the right foot pedal and applying hand pressure to the right handle occurring simultaneously and in a manner to move the right carriage along the axis $X_r$.

29. An exercise cycle comprising:

a frame;

a left forward riding wheel operatively connected to the frame for rotation relative to the frame about a left forward riding wheel axis;

a right forward riding wheel operatively connected to the frame for rotation relative to the frame about a right forward riding wheel axis;

a rear riding wheel operatively connected to the frame for rotation relative to the frame about a rear riding wheel axis;

a human-powered drive mechanism operatively connected to the frame and powered by a user's legs, the drive mechanism being adapted to transmit movement of the user's legs relative to the frame into rotary motion of at least one of the wheels to thereby propel the exercise cycle; and a spring mechanism;

the riding wheels being engageable with a riding surface, such as a road, for enabling the cycle to roll along the riding surface;

the left and right forward riding wheels further being operatively connected to the frame in a manner to enable the left and right forward riding wheels to be moveable between upright positions and slanted positions, the left and right forward riding wheel axes being generally parallel to the riding surface and the forward riding wheels being in contact with the riding surface when the forward riding wheels are in their upright positions, the left and right forward riding wheel axes being generally slanted relative to riding surface and the forward riding wheels being in contact with the riding surface when the forward riding wheels are in their slanted positions;

the spring mechanism being configured and adapted for biasing the forward riding wheels in their upright positions.

30. An exercise cycle as set forth in claim 29 further comprising:

a left linearly reciprocating assembly operatively mounted on the frame for linear reciprocating motion relative to the frame along an axis $X_l$, the left reciprocating assembly comprises a left carriage movable along the axis $X_l$, a left foot pedal engageable by a user's left foot, and a left handle engageable by a user's left hand, the left foot pedal and the left handle being operatively connected to the left carriage such that the left foot pedal and the left handle move together with the carriage when the left carriage is moved along the axis $X_l$, the left handle being spaced from the left foot pedal in a manner to enable the user to push or pull the left handle with the user's left hand to move the left reciprocating assembly along the axis $X_l$ at the same time the user pushes or pulls the left foot pedal with the user's left foot to move the left reciprocating assembly along the axis $X_l$; and a right linear reciprocating assembly operatively mounted on the frame for linear reciprocating motion relative to the frame along an axis $X_r$, the right reciprocating assembly comprises a right carriage movable along the axis $X_r$, a right foot pedal engageable by a user's right foot, and a right handle engageable by a user's right hand, the right foot pedal and the right handle being operatively connected to the right carriage such that the right foot pedal and the right handle move together with the carriage when the right carriage is moved along the axis $X_r$, the right handle being spaced from the right foot pedal in a manner to enable the user to push or pull the right handle with the user's right hand to move the right reciprocating assembly along the axis $X_r$ at the same time the user pushes or pulls the right foot pedal with the user's right foot to move the right reciprocating assembly along the axis $X_r$;

the drive mechanism being operatively connected to the left and right linear reciprocating members and operatively connected to the rear riding wheel, the drive mechanism being adapted and configured for converting linear reciprocating motion of the left and right linear reciprocating members to rotational motion of the rear riding wheel about the rear riding wheel axis.

31. An exercise cycle as set forth in claim 29 further comprising:

a hinge;

the frame having a forward frame member and a rearward frame member;

the hinge operatively connecting the forward frame member to the rearward frame member such that the forward and rearward frame members are pivotally moveable relative to each other about a hinge axis between operable and stowable positions;

the drive mechanism comprising a forward transmission wheel, a rearward transmission wheel, and an endless loop assembly, one of the forward and rearward transmission wheels constituting a driven transmission wheel;

the forward transmission wheel being operatively connected to the forward frame member for rotational movement about a forward axis;

the rearward transmission wheel being operatively connected to the rearward frame member for rotational movement about a rearward axis;

the endless loop assembly being trained around the forward and rearward transmission wheels such that movement of one of the forward transmission wheel, rearward transmission wheel, and endless loop assembly causes movement of the other two of the forward transmission wheel, rearward transmission wheel, and endless loop assembly;

the forward transmission wheel being a distance $D_o$ from the rearward transmission wheel when the frame members are in their operable position, the forward transmission wheel being a distance $D_s$ from the rearward transmission wheel when the frame members are in their stowed position, the distance $D_s$ being less than the distance $D_o$;

the endless loop assembly and frame members being configured and adapted such that the endless loop assembly remains trained around the forward and rearward transmission wheels as the frame members are moved between the operable and stowable positions.

* * * * *